(12) United States Patent
Nakamura et al.

(10) Patent No.: US 7,213,677 B2
(45) Date of Patent: May 8, 2007

(54) MOTOR-DRIVEN TYPE POWER STEERING APPARATUS

(75) Inventors: Yasuhiro Nakamura, Mie (JP); Tomonori Sugiura, Osaka (JP); Souichi Iwasa, Osaka (JP); Tomomasa Machida, Osaka (JP)

(73) Assignee: Koyo Seiko Co., Ltd., Osaka-shi, Osaka (JP)

( * ) Notice: Subject to any disclaimer, the term of this patent is extended or adjusted under 35 U.S.C. 154(b) by 0 days.

(21) Appl. No.: 10/743,317

(22) Filed: Dec. 23, 2003

(65) Prior Publication Data
US 2004/0182188 A1  Sep. 23, 2004

(30) Foreign Application Priority Data
Dec. 24, 2002  (JP) ............... P.2002-373289

(51) Int. Cl.
*B62D 5/04* (2006.01)
(52) U.S. Cl. ............ 180/444; 74/388 PS; 74/409; 267/161; 384/517
(58) Field of Classification Search ........... 280/443, 280/444; 74/409, 427, 425, 388 PS, 606 R; 267/161, 163, 164; 384/517, 535, 581
See application file for complete search history.

(56) References Cited

U.S. PATENT DOCUMENTS

| 6,634,103 | B2 * | 10/2003 | Muraki et al. ........... 29/898.07 |
|---|---|---|---|
| 6,763,738 | B1 * | 7/2004 | Tsutsui et al. ........... 74/388 PS |
| 6,823,962 | B2 * | 11/2004 | Iwasa et al. ............. 180/444 |
| 2001/0002630 | A1 * | 6/2001 | Watanabe et al. ......... 180/444 |
| 2001/0040067 | A1 * | 11/2001 | Murakami et al. ........ 180/444 |
| 2002/0017420 | A1 * | 2/2002 | Kinme et al. ............ 180/444 |
| 2004/0163879 | A1 * | 8/2004 | Segawa ................. 180/444 |
| 2004/0245040 | A1 * | 12/2004 | Eda et al. .............. 180/444 |

FOREIGN PATENT DOCUMENTS

| JP | 2001-108025 | 4/2001 |
|---|---|---|
| JP | 2002-96749 | 4/2002 |

\* cited by examiner

*Primary Examiner*—Anne Marie Boehler
(74) *Attorney, Agent, or Firm*—McGinn IP Law Group, PLLC

(57) ABSTRACT

A motor-driven type power steering apparatus includes: a drive gear connected to an output shaft of a motor; a driven gear in mesh with the drive gear, which is connected to a steering unit; a bearing for supporting one end of the drive gear; a support portion in which the bearing is disposed; and a curved leaf spring which has a length larger than a peripheral length of the bearing and fitted between the bearing and the support portion in a resiliently deformed state. The curved leaf spring urges the bearing so that a distance between an axis of the driven gear and an axis of the drive gear decreases.

17 Claims, 5 Drawing Sheets

MOTOR-DRIVEN TYPE POWER STEERING APPARATUS

BACKGROUND OF THE INVENTION

The invention relates to a motor-driven type power steering apparatus using a motor as a source of generation of steering-assisting power.

A motor-driven type power steering apparatus for a vehicle includes a motor for steering-assisting purposes, and a reduction gear mechanism for transmitting a rotational force of the motor to a steering unit. The power steering apparatus assists the operation of the steering unit corresponding to the rotation of the steering unit by the rotation of the motor so that the driver's labor, required for the steering operation, can be reduced.

The reduction gear mechanism includes a worm serving as a drive gear which rotates in accordance with the rotation of the motor, and a worm wheel serving as a driven gear which meshes with the worm.

In the motor-driven type power steering apparatus using such a reduction gear mechanism, in order to reduce the amount of backlash in meshed portions of the worm and worm wheel so as to reduce rattle noise due to the backlash during the steering operation, the worm, the worm wheel, bearings, a housing, etc., are suitably selected and assembled (so-called stratified assembly) so that the rotation-axis distance between the axis of rotation of the worm and the axis of rotation of the worm wheel can fall within an allowable range. However, much time is required for this assembling operation.

There is known the type of motor-driven type power steering apparatus (for example, JP-A-2002-96749) in which a shaft portion of a worm disposed close to a motor and a shaft portion of the worm disposed remote from the motor are rotatably supported on a housing through respective rolling bearings, and a rubber ring is mounted on an outer peripheral surface of the motor-remote-side shaft portion of the worm, and the worm is urged or pressed toward the worm wheel by an elastic restoring force of the rubber ring so as to reduce the rotation-axis distance, thereby reducing the amount of backlash in meshed portions of the worm and worm wheel.

However, in the related motor-driven type power steering apparatus of the above construction in which the amount of backlash is reduced by the use of the rubber ring, each time the steering operation is effected, a load and a rotational torque are applied to the rubber ring in a radial direction, and therefore the rubber ring is liable to be subjected to deterioration such as permanent set in fatigue. And besides, the degree of freedom for setting a preload by the urging force is relative low since the elastic restoring force of the rubber ring itself urges the worm.

SUMMARY OF THE INVENTION

This invention has been made in view of the above circumstances, and a main object of the invention is to provide a motor-driven type power steering apparatus in which a drive gear can be moved in directions to increase and decrease the rotation-axis distance, and besides a structure around the drive gear can be made compact.

In order to solve the aforesaid object, the invention is characterized by having the following arrangement.

(1) A motor-driven type power steering apparatus comprising:
  a drive gear connected to an output shaft of a motor;
  a driven gear in mesh with the drive gears which is connected to a steering unit;
  a bearing for supporting one end of the drive gear;
  a support portion in which the bearing is disposed; and
  a curved leaf spring which has a length larger than a peripheral length of the bearing and fitted between the bearing and the support portion in a resiliently deformed state, wherein the curved leaf spring urges the bearing so that a distance between an axis of the driven gear and an axis of the drive gear decreases.

(2) The apparatus according to (1), wherein the support portion includes a recess into which opposite ends of the curved leaf spring are inserted, and which is located distant from the axis of the driven gear with respect to the axis of the drive gear.

(3) The apparatus according to (2), wherein the curved leaf spring includes an abutment portion formed adjacent to the end thereof and a bent portion projected outwardly from the abutment portion, the abutment portion abutting against an outer peripheral surface of the bearing and the bent portion being inserted into the recess of the support portion.

(4) The apparatus according to (1), wherein the support portion has a hole in which the bearing is disposed and which has a substantially oval shape such that a radius between a center of the drive gear and a first side region of the hole which is located distant from the axis of the driven gear with respect to the center is larger than a radius between the center and a second side region which is located close to the axis of the driven gear with respect to the center.

(5) The apparatus according to (1), wherein the end of the drive gear supported by the bearing is distant from the motor with respect to the other end.

(6) The apparatus according to (1) further comprising a pressing member for pressing the drive gear in a direction away from the motor,
  wherein the curved leaf spring includes a spring piece portion for pressing the bearing toward the motor.

DETAILED DESCRIPTION OF PREFERRED EMBODIMENTS

A preferred embodiment of the present invention will now be described in detail with reference to the drawings.

Embodiment 1

Figure 1:
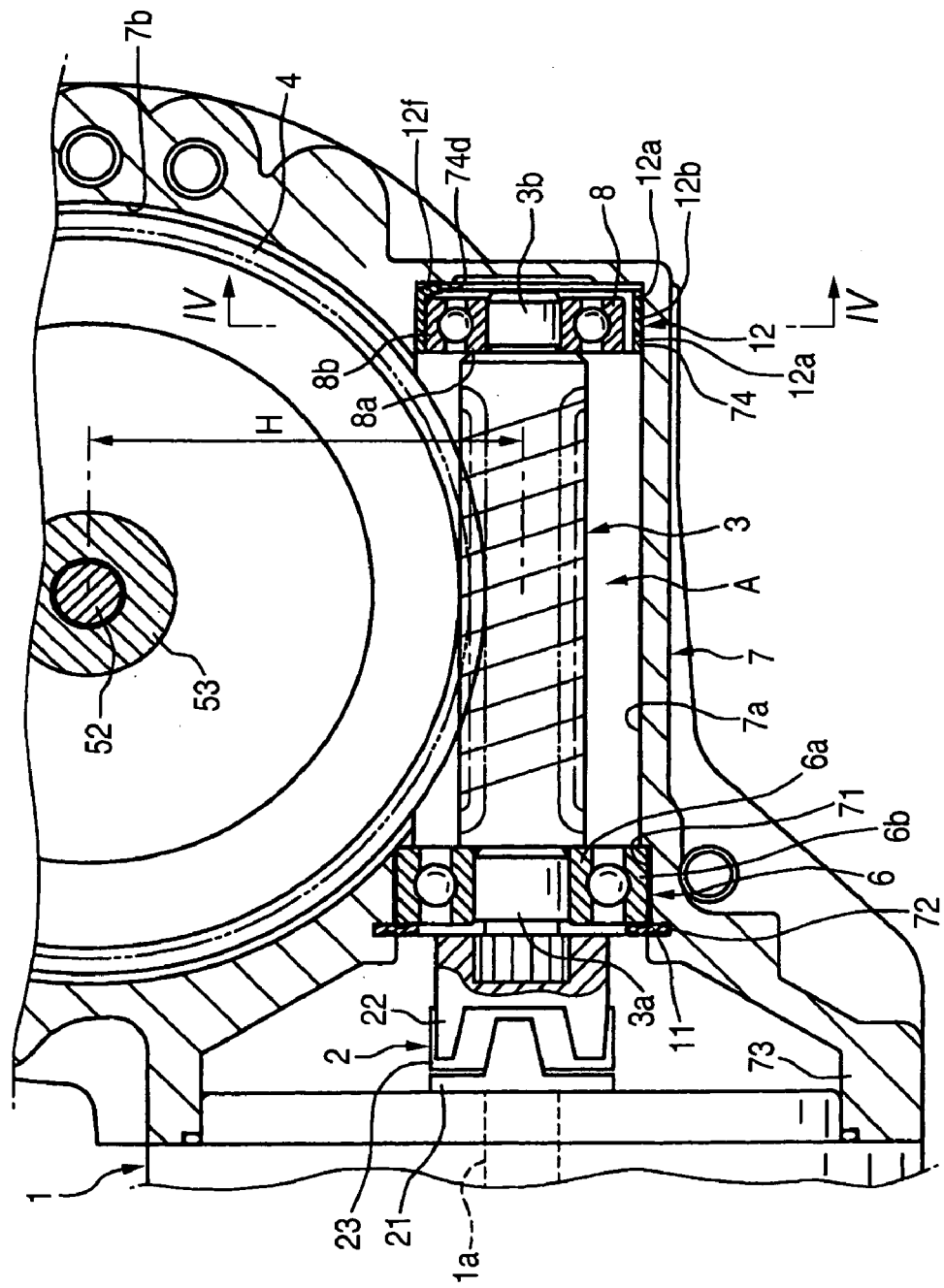
FIG. 1 is an enlarged cross-sectional view showing the construction of a reduction gear mechanism of a motor-driven type power steering apparatus of the invention.
Figure 2:
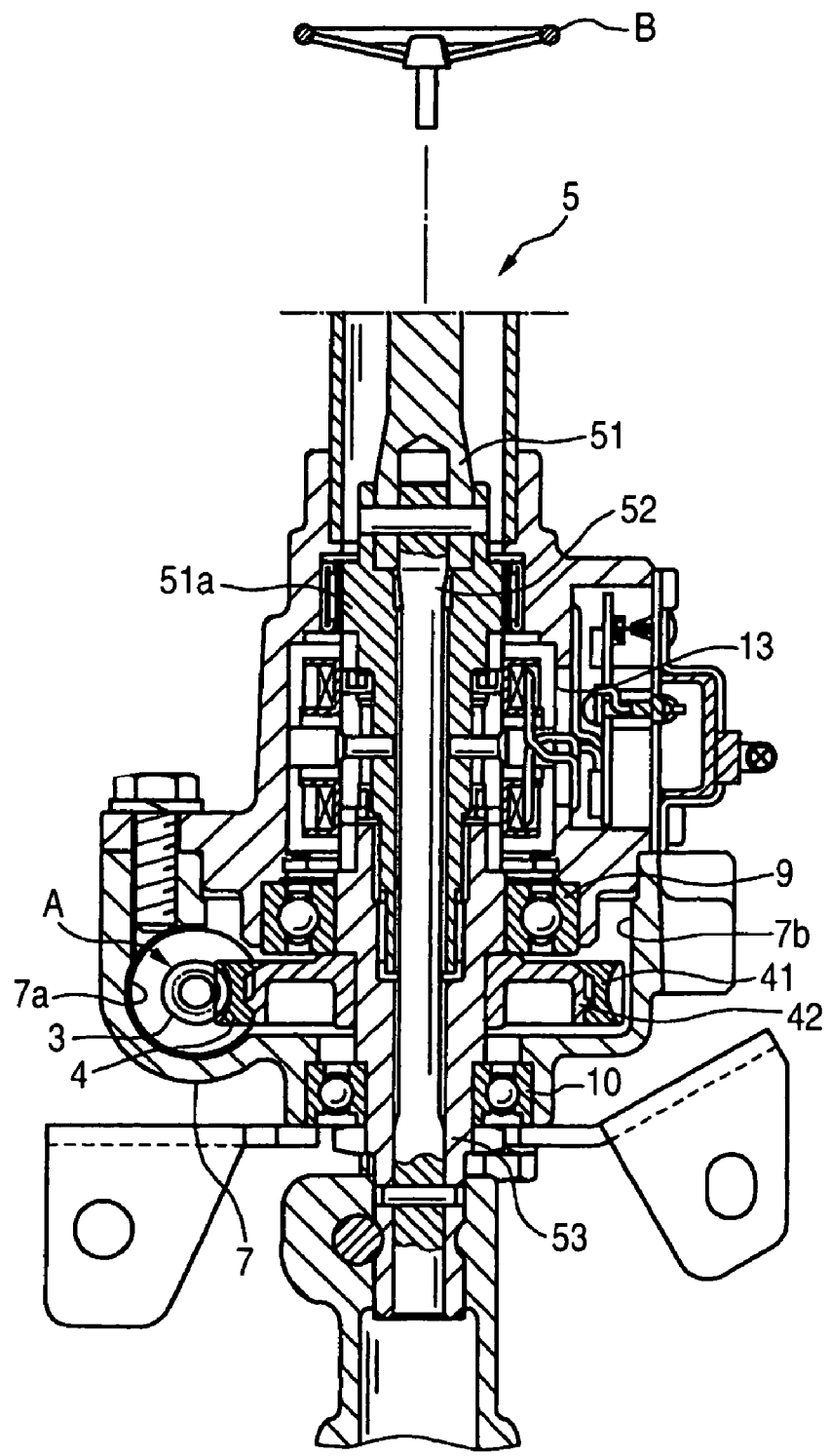
FIG. 2 is a cross-sectional view showing the overall construction of the motor-driven type power steering apparatus of the invention.

FIG. 1 is an enlarged cross-sectional view showing the construction of a reduction gear mechanism of a motor-driven type power steering apparatus of the invention, and FIG. 2 is a cross-sectional view showing the overall construction of the motor-driven type power steering apparatus.

The motor-driven type power steering apparatus comprises a motor 1 for steering-assisting purposes, the reduction gear mechanism A, and a steering unit 5 connected to the reduction gear mechanism A. The reduction gear mechanism A includes a worm 3 serving as a drive gear, which is coupled to an output shaft 1a of the motor 1 through a shaft coupling 2, and a worm wheel 4 serving as a driven gear which meshes with the worm 3.

The steering unit 5 includes: a first steering shaft 51 which is connected at one end thereof to a steering wheel B for steering purposes and has a tubular portion 51a at the other end thereof; a torsion bar 52 which is received in the tubular portion 51a of the first steering shaft 51, is connected at one end thereof to the tubular portion 51a, and can be twisted by a steering torque applied to the steering wheel B; and a second steering shaft 53 which is connected at one end thereof to the other end of the torsion bar 52, and is connected to the reduction gear mechanism A. The second steering shaft 53 is connected to a steering mechanism (not shown), for example, of the rack-and-pinion type via a universal joint.

The worm 3 of the reduction gear mechanism A has shaft portions 3a and 3b formed respectively at opposite ends thereof. The shaft portion 3a at one end of the worm is rotatably supported by a support member 7 of aluminum through a first rolling bearing 6, and is coupled to the output shaft 1a of the motor 1. The shaft portion 3b at the other end is supported by the support member 7 through a second rolling bearing 8. The shaft portions 3a and 3b are press-fitted in inner rings of the rolling bearings 6 and 8, respectively.

The worm wheel 4 comprises an annular toothed member 41, and a core member 42 of metal fixed to the inner side of the annular toothed member 41. The core member 42 is fixedly mounted or fitted on the second steering shaft 53 intermediate the opposite ends thereof.

The support member 7 includes a first receiving portion 7a receiving the worm 3 therein, and a second receiving portion 7b receiving the worm wheel 4 therein. The shaft portions 3a and 3b of the worm 3 are rotatably supported by the first receiving portion 7a through the rolling bearings 6 and 8, and the worm wheel 4 is supported by the second receiving portion 7b through the second steering shaft 53 and two rolling bearings 9 and 10 fitted on the second steering shaft 53.

The first receiving portion 7a is elongated in the direction of the axis of the worm 3. A support hole 71, an annular groove 72 and a motor-mounting portion 73 are provided at one longitudinal end portion of the first receiving portion 7a. The rolling bearing 6 is loosely fitted in and supported by the support hole 71 communicating with the annular groove. A retainer ring 11 in the form of a wavy plate is fitted in the annular groove 72, and comes in contact with an outer ring 6b of the rolling bearing 6 to limit the movement of this rolling bearing 6 in the axial direction. The motor 1 is mounted on the motor-mounting portion 73.

Figure 3:
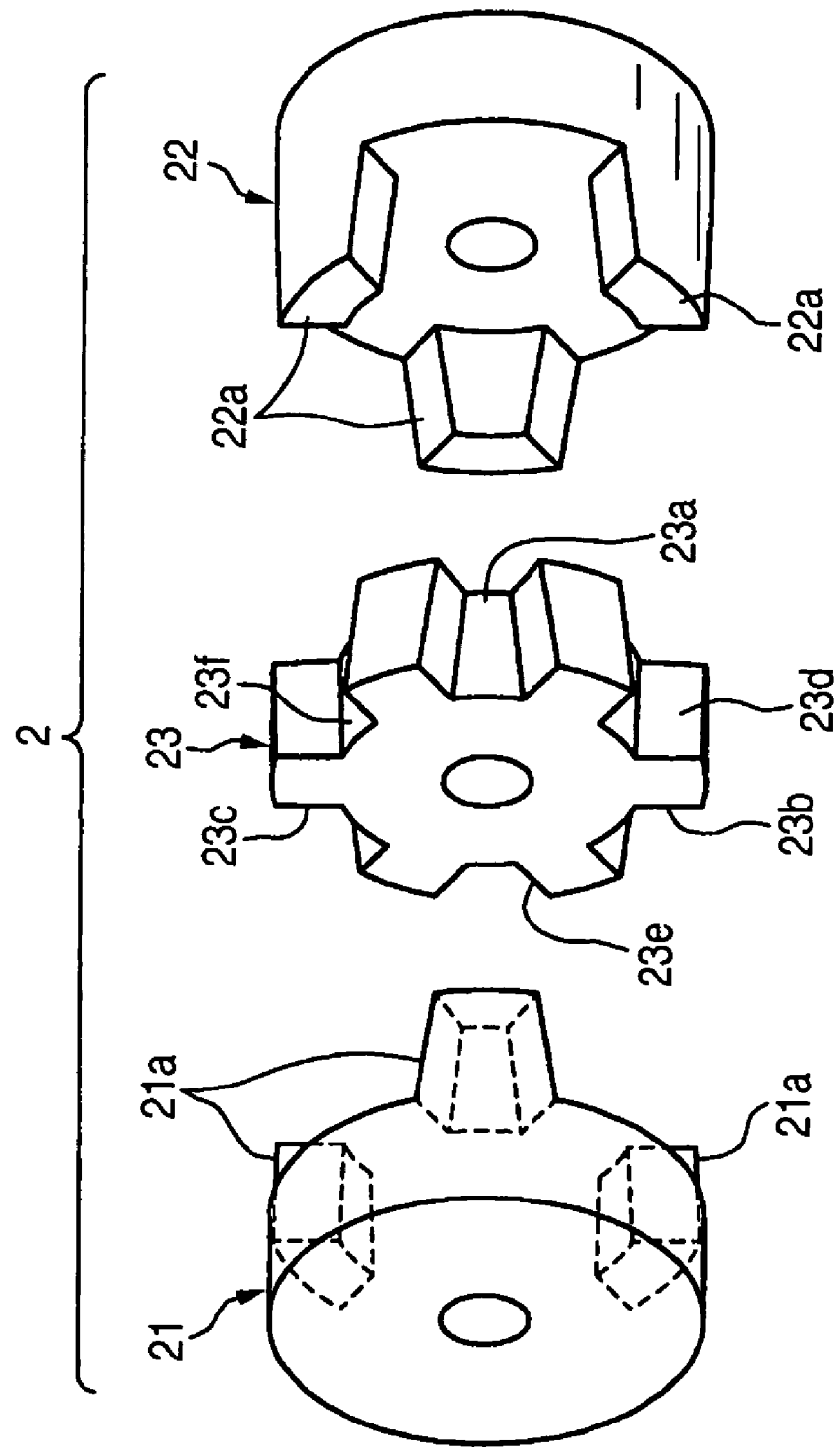
FIG. 3 is a perspective view showing the construction of a shaft coupling used in the motor-driven type power steering apparatus of the invention.

FIG. 3 is a perspective view showing the construction of the shaft coupling.

The output shaft 1a of the motor 1 and the shaft portion 3a of the worm 3 are coupled together through a shaft coupling 2. The shaft coupling 2 comprises first and second coupling members 21 and 22 each having three meshing teeth 21a, 22a formed at one end thereof, and an elastic toothed member 23 which is interposed between the coupling members 21 and 22, and has six meshing portions 23a to 23f formed on an outer peripheral surface thereof. The meshing portions 23a to 23f mesh with the meshing teeth 21a and 22a. Teeth surfaces of each teeth 21a, 22a of each coupling member 21, 22 are slanting such that the teeth 21a, 22a are decreasing in size gradually from its proximal end toward its distal end and that the thickness of the teeth 21a, 22a is increasing gradually from a rotation axis-side edge toward an outer periphery-side edge.

As to the elastic toothed member 23, the meshing portions 23a to 23c for respectively meshing with the meshing teeth 21a, and the meshing portions 23d to 23f for respectively meshing with the meshing teeth 22a are alternately arranged in the circumferential direction. The meshing teeth 21a mesh respectively with the meshing portions 23a to 23c, while the meshing teeth 22a mesh respectively with the meshing portions 23d to 23f, and by doing so, a gap between each of the coupling members 21 and 22 and the elastic toothed member 23 in the rotational direction, as well as a gap between the two in the axial direction, is eliminated, and besides the worm 3 is urged in the direction away from the motor. The first coupling member 21 is fitted on the output shaft 1a, and the second coupling member 22 is serration-fitted on the shaft portion 3a. The meshing portions 23a to 23c and the meshing portions 23d to 23f extend in opposed directions in the axial direction, and the meshing engagement is effected in such a manner that an axial force is exerted between the meshing portions 23a to 23c and the meshing teeth 21a and also between the meshing portions 23d to 23f and the meshing teeth 22a. With this construction, the second coupling member 22 is urged away from the motor with respect to the first coupling member 21 which is prevented by the output shaft 1a from moving in the axial direction.

A support hole 74 is provided at the other end portion of the first receiving portion 7a, and the second rolling bearing 8 and a curved leaf spring 12, fitted on the rolling bearing 8, are supported in this support hole 74. The support hole 74 has a generally oval shape such that a radius between a center of the worm 3 and a first side region 74a of the support hole which is located distant from the axis of rotation of the worm wheel 4 with respect to the center in a radius direction of the support hole 74 is larger than a radius between the center and a second side region 74b which is located close to the axis of rotation of the worm wheel 4 with respect to the center in the radius direction. The curved leaf spring 12 can be resiliently deformed between a peripheral surface of the first side region 74a and the rolling bearing 8, and besides there is provided a gap for allowing the rolling bearing 8 to be moved in directions to increase and decrease a rotation-axis distance H between the axis of rotation of the worm 3 and the axis of rotation of the worm wheel 4. A recess 74c for receiving end portions 12a and 12b of the curved leaf spring 12 is formed in the peripheral surface of the first side region 74a, and is disposed substantially centrally of the peripheral length of this first side region 74a.

Figure 4:
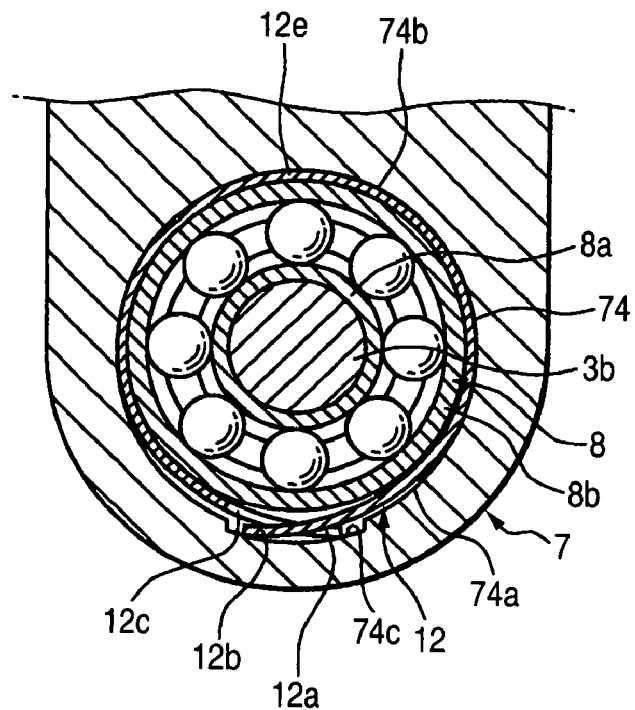
FIG. 4 is a cross-sectional view taken along the line IV—IV of FIG. 1.
Figure 5:
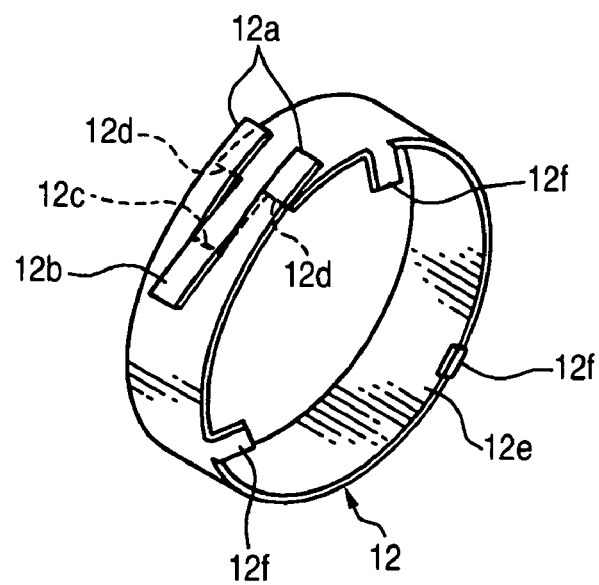
FIG. 5 is a perspective view showing the construction of a curved leaf spring used in the motor-driven type power steering apparatus of the invention.

FIG. 4 is an enlarged cross-sectional view taken along the line IV—IV of FIG. 1, and FIG. 5 is a perspective view showing the construction of the curved leaf spring.

The curved leaf spring 12 is constituted by a strip or band of spring steel, an intermediate portion of which is curved into a substantially round shape along the outer peripheral surface of the rolling bearing 8, and has a length larger than the peripheral length of the rolling bearing 8. A notch 12c is formed in one end portion 12a of this curved leaf spring, and is disposed centrally of the width thereof, while notches 12d and 12d are formed respectively in opposite side edge portions of the other end portion 12b. The end portion 12a is fitted in the notches 12d and 12d while the end portion 12b is fitted in the notch 12c, and by doing so, the end portions 12a and 12b can be arranged to intersect each other without increasing the width, and besides the end portions 12a and 12b are spaced from the outer peripheral surface of the rolling bearing 8, that is, spaced from a circle in which a curved portion 12e lies. The end portions 12a and 12b of the curved leaf spring 12 are received in the recess 74c, and are resiliently deformed in this recess 74*c* to urge the worm 3 through the rolling bearing 8 in the direction to decrease the rotation-axis distance H.

A plurality of spring piece portions 12*f* are formed integrally on one side edge of the curved portion 12*e* of the curved leaf spring 12, and are spaced from one another in the circumferential direction. The spring piece portions 12*f* are held against a side surface 74*d* of the support hole 74 to urge the second rolling bearing 8 toward the motor 1. The spring piece portions 12*f* project from the curved portion 12*e*, and are inclined inwardly relative to the peripheral surface of the curved portion 12*e*, and these spring piece portions 12*f*, when held against the side surface 74*d* of the support hole 74, are resiliently deformed, and a reaction force of their resilient restoring force is applied to the worm 3 via an outer ring 8*b*, balls, an inner ring 8*a* of the second rolling bearing 8, thereby urging the worm 3 toward the motor 1.

The curved leaf spring 12, made of spring steel, is contacted at its inner surface with the outer ring 8*b* of the rolling bearing 8 made of steel, and is contacted at its outer surface with the support member 7 made of aluminum. Therefore, a cushioning material is coated on each of the inner and outer surfaces of the curved leaf spring 12 over an entire area thereof so as to prevent noises from being produced by the above contact. Noises are more liable to be produced when the curved leaf spring is held in contact with the rolling bearing 8 as compared with the case where the curved leaf spring is held in contact with the support member 7, and therefore without coating the cushioning material on both of the inner and outer surfaces of the curved leaf spring 12, the cushioning material may be coated only on the inner surface of the curved leaf spring 12.

A torque sensor 13 is contained in the support member 7, which detects a steering torque applied to the steering wheel B on the basis of the amount of a relative rotational displacement between the steering shafts 51 and 53 which corresponds to the amount of twisting of the torsion bar 52. The driving of the motor 1 is controlled in accordance with a torque amount or the like detected by the torque sensor 13.

In the motor-driven type power steering apparatus of the above construction, to incorporate the worm 3 into the apparatus, the curved leaf spring 12 is inserted into the support hole 74 in the support member 7, and the end portions 12*a* and 12*b* of the curved leaf spring 12 are inserted into the recess 74*c*, thereby positioning the curved leaf spring 12, that is, setting the direction of urging of the rolling bearing 8 by the end portions 12*a* and 12*b*. Then, the worm 3, having the rolling bearings 6 and 8 press-fitted respectively on the shaft portions 3*a* and 3*b*, is inserted into the first receiving portion 7*a*, and the second rolling bearing 8 is inserted into the curved leaf spring 12, and the first rolling bearing 6 is loosely fitted into the support hole 71, and the retainer ring 11 is fitted in the annular groove 72, thereby limiting the movement of the worm 3 in the axial direction.

The end portions 12*a* and 12*b* of the curved leaf spring 12, urging the incorporated worm 3, are received in the recess 74*c* in the support member 7, and the rolling bearing 8 and the worm 3, supported by the rolling bearing 8, are urged by the resilient force of the end portions 12*a* and 12*b* in the direction (that is, in the direction toward the worm wheel) to decrease the rotation-axis distance H. Therefore, the amount of backlash in the meshed portions of the worm 3 and worm wheel 4 can be reduced, and even when the amount of wear of the teeth of the worm 3 and worm wheel 4 increases or even when the worm 3 and worm wheel 4 contract due to the low temperature, the amount of backlash in the meshed portions can be reduced whereby suppressing the rattle noise.

And besides, the end portions 12*a* and 12*b* of the curved leaf spring 12 can be resiliently deformed in the directions to increase and decrease the rotation-axis distance H, and therefore even when the worm wheel 4, having the annular toothed member 41 made of a synthetic resin, is expanded by a rise in the atmosphere temperature, or is expanded upon absorbing of moisture, a meshing resistance produced at the meshed portions is prevented from increasing, so that the worm 3 and the worm wheel 4 can be smoothly rotated.

The curved leaf spring 12 is formed by curving the sheet of metal (such as spring steel) having the length larger than the peripheral length of the rolling bearing 8, and therefore as compared with the rubber ring used in the conventional apparatus, the curved leaf spring 12 has higher durability, and besides the degree of freedom for setting the preload can be made relatively high. In addition, as compared with the conventional apparatus using the rubber ring, the structure around the worm gear 3 can be made compacts and therefore the overall size of the motor-driven type power steering apparatus can be reduced.

Furthermore, with virtue of the provision of the notches 12*c* and 12*d*, the end portions 12*a* and 12*b* of the curved leaf spring 12 intersect each other, and therefore the curved leaf spring 12 can be inserted in the support hole 74 without increasing its width relative to the rolling bearing 8, and the resilient restoring force of the end portions 12*a* and 12*b* is easily applied to the rolling bearing 8.

The curved leaf spring 12 is curved along the outer peripheral surface of the rolling bearing 8, and a gap between the curved leaf spring 12 and the rolling bearing 8, as well as a gap between the curved leaf spring 12 and the second side region 74*b* of the support portion 74 are eliminated, and therefore the movement of the worm 3 in a direction intersecting the directions of the rotation-axis distance H is limited. A tooth trace of each of the worm 3 and the worm wheel 4 is made spiral in the rotational direction relative to the axis of rotation. When a rotational torque is applied from the worm 3 to the worm wheel 4, that is, when the steering operation is assisted by the rotation of the motor 1, a component of force (hereinafter referred to as "meshing reaction force") is produced so as to move the worm 3 in the radial direction along the tooth trace of the worm wheel 4. The worm 3 is pressed by this meshing reaction force, and the second rolling bearing 8 is pressed by this pressing force in the direction intersecting the directions of the rotation-axis distance H. However, the movement of the rolling bearing 8 by this pressing force and hence the movement of the worm 3 can be limited with the above-described construction.

The worm 3 thus urged by the curved leaf spring 12 is oscillated with respect to the support portion for the first rolling bearing 6 in the directions of the rotation-axis distance. Since the first rolling bearing 6 is loosely fitted in the support hole 71, the second rolling bearing 8 together with the worm 3 can be pivotally moved. And besides, the worm 3 is coupled to the output shaft 1*a* via the shaft coupling 2 having the elastic toothed member 23, and therefore the amount of pivotal movement of the worm 3 is increased. Therefore, even when the amount of expansion of the worm wheel 4 having the annular toothed member 41 made of a synthetic resin due to a temperature rise and the absorption of moisture increases, the meshing resistance produced at the meshed portions is prevented from increasing, so that the worm 3 and the worm wheel 4 can be smoothly rotated.

The worm 3 is urged away from the motor 1 by the shaft coupling 2 comprising the first and second coupling members 21 and 22 and the elastic toothed member 23 interposed between the coupling members 21 and 22, and is urged toward the motor 1 by the spring piece portions 12*f* of the curved leaf spring 12. Therefore, the forces acting on the worm 3 in the axial direction can be balanced, so that the rotating performance of the worm 3 can be enhanced.

The worm 3 is connected to the output shaft 1$a$ via the shaft coupling 2 having the elastic toothed member 23, and therefore the elastic toothed member 23 prevents the propagation of noise produced at the motor 1, and besides prevents any noise from being produced at the shaft coupling portion. The movement of the rolling bearing 6 is prevented by the retainer ring 11 comprising the wavy plate, and therefore the efficiency of the operation for mounting the rolling bearing is enhanced as compared with the case where the rolling bearing is fixed by the use of a threaded ring.

Second Embodiment

Figure 6:
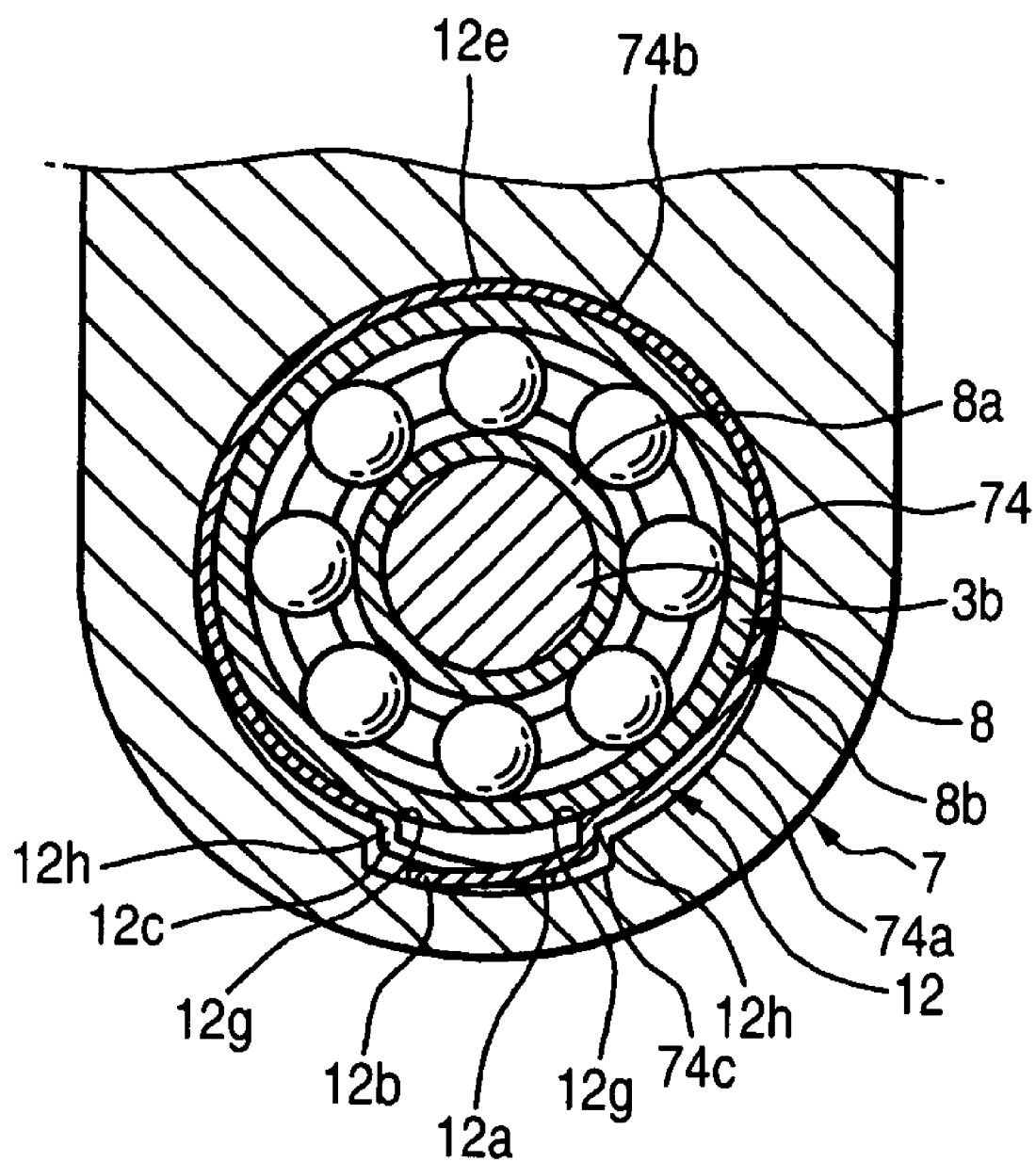
FIG. 6 is a cross-sectional view showing a major portion of a second embodiment of a motor-driven type power steering apparatus of the invention.

FIG. 6 is a cross-sectional view showing a major portion of a second embodiment of a motor-driven type power steering apparatus of the invention.

In the motor-driven type power steering apparatus of the second embodiment, a curved leaf spring 12, generally similar to the curved leaf spring 12 of the first embodiment, has abutment portions 12$g$ and 12$g$ for abutting against an outer peripheral surface of a second rolling bearing 8, which is formed adjacent respectively to end portions 12$a$ and 12$b$ thereof, and bent portions 12$h$ and 12$h$ project outwardly from the abutment portions 12$g$ and 12$g$, respectively. Each of the end portions 12$a$ and 12$b$ can be resiliently deformed to be turned about the corresponding abutment portion 12$g$.

In the second embodiment, the bent portions 12$h$ and 12$h$ are located such that a peripheral length between the two bent portions 12$h$ and 12$h$ is smaller than the peripheral length of the second rolling bearing 8. When the end portions 12$a$ and 12$b$ are inserted into a recess 74$c$ in a support hole portion 74, and are resiliently deformed, the abutment portions 12$g$ and 12$g$ abut against the outer peripheral surface of the second rolling bearing 8.

In the second embodiment, the abutting portions 12$g$ and 12$g$, disposed adjacent respectively to the end portions 12$a$ and 12$b$, abut against the outer peripheral surface of the second rolling bearing 8, and the end portions 12$a$ and 12$b$ can be resiliently deformed to be turned about these abutment portions 12$g$ and 12$g$, respectively, and therefore the degree of freedom for setting a preload can be made higher.

The other constructions and operations are similar to those of the first embodiment, and therefore corresponding parts are designated by identical reference numerals, respectively, and detailed description thereof, as well as description of effects of the operations, will be omitted.

In the above embodiments, although the shaft portion 3$b$ of the worm 3 is supported by the rolling bearing 8, this shaft portion may be supported by any other suitable bearing such as a slide bearing. Although the worm 3 is urged away from the motor by the shaft coupling 2, the means for urging the worm 3 away from the motor may comprise a resilient member such as a coil spring.

In the above embodiments, although there is used the worm gear having the worm 3 serving as the drive gear and the worm wheel 4 serving as the driven gear, a bevel gear or a hypoid gear may be used.

As described above in detail, according to the invention, the curved leaf spring has higher durability as compared with the related apparatus using the rubber ring, and besides the degree of freedom for setting the preload can be made relatively high Furthermore, as compared with the conventional apparatus using the rubber ring, the structure around the drive gear can be made compact, and therefore the overall size of the motor-driven type power steering apparatus can be reduced.

Further according to the invention, the degree of freedom for setting the preload can be made higher.

According to the invention, the axial forces, acting on the drive gear, can be balanced, so that the rotating performance of the drive gear can be enhanced.

What is claimed is:

1. A motor-driven power steering apparatus comprising:
    a drive gear connected to an output shaft of a motor;
    a follower gear meshed with the drive gear, which is connected to a steering unit;
    a bearing for supporting one end of the drive gear;
    a support portion in which the bearing is disposed; and
    a curved leaf spring comprising a length larger than a peripheral length of the bearing and fitted between the bearing and the support portion in a resiliently deformed state, said curved leaf spring being fitted along an outer peripheral surface of the bearing and an inner surface of the support portion,
    wherein the curved leaf spring urges the bearing such that a distance between an axis of the follower gear and an axis of the drive gear decreases,
    wherein said curved leaf spring comprises end portions, said end portions being selected from the group consisting of overlapping end portions and end portions having a bent portion, and
    wherein a substantially entire intermediate portion of said curved leaf spring except opposite said overlapping end portions or said end portions having a bent portion of said curved leaf spring contacts said inner surface of said support portion and said outer peripheral surface of said bearing.

2. The apparatus according to claim 1, wherein the support portion includes a recess into which opposite ends of the curved leaf spring are inserted, and which is located distant from an axis of the follower gear with respect to an axis of the drive gear.

3. The apparatus according to claim 1, wherein an end of the drive gear supported by the bearing is distant from the motor with respect to an other end of said drive gear.

4. The apparatus according to claim 1, further comprising:
    a pressing member for pressing the drive gear in a direction away from the motor,
    wherein the curved leaf spring includes a spring piece portion for pressing the bearing toward the motor.

5. The apparatus according to claim 1, wherein said curved leaf spring comprises a strip of spring steel.

6. The apparatus according to claim 1, wherein said curved leaf spring comprises abutment portions for abutting against the outer peripheral surface of the bearing.

7. The apparatus according to claim 6, wherein said abutment portions comprise bent portions projecting outwardly from said abutment portions.

8. The apparatus according to claim 1, wherein a resilient force of end portions of said curved leaf spring urges said bearing.

9. The apparatus according to claim 1, wherein said end portions comprise said overlapping end portions, and
    wherein said overlapping end portions of said curved leaf spring are received in a recess formed in said support portion.

10. The apparatus according to claim 1, wherein said end portions comprise said end portions having said bent portion, and
    wherein said bent portions are received in a recess formed in said support member.

11. A motor-driven type power steering apparatus comprising:
    a drive gear connected to an output shaft of a motor;
    a follower gear meshed with the drive gear, which is connected to a steering unit;

a bearing for supporting one end of the drive gear;
a support portion in which the bearing is disposed; and
a curved leaf spring comprising a length larger than a peripheral length of the bearing and fitted between the bearing and the support portion in a resiliently deformed state,
wherein the curved leaf spring urges the bearing such that a distance between an axis of the follower gear and an axis of the drive gear decreases,
wherein the support portion includes a recess into which opposite ends of the curved leaf spring are inserted, and which is located distant from an axis of the follower gear with respect to an axis of the drive gear,
wherein the curved leaf spring includes an abutment portion formed adjacent to an end of the curved leaf spring and a bent portion projected outwardly from the abutment portion, the abutment portion abutting against an outer peripheral surface of the bearing and the bent portion being inserted into the recess of the support portion.

12. A motor-driven type power steering apparatus comprising:
a drive gear connected to an output shaft of a motor;
a follower gear meshed with the drive gear, which is connected to a steering unit;
a bearing for supporting one end of the drive gear;
a support portion in which the bearing is disposed; and
a curved leaf spring comprising a length larger than a peripheral length of the bearing and fitted between the bearing and the support portion in a resiliently deformed state, said curved leaf spring being fitted along an outer peripheral surface of the bearing and an inner surface of the support portion,
wherein the curved leaf spring urges the bearing such that a distance between an axis of the follower gear and an axis of the drive gear decreases,
wherein the support portion comprises a hole in which the bearing is disposed and which comprises a substantially oval shape such that a radius between a center of the drive gear and a first side region of the hole which is located distant from the axis of the follower gear with respect to the center is larger than a radius between the center and a second side region which is located close to the axis of the follower gear with respect to the center.

13. A motor-driven power steering apparatus comprising:
a drive gear connected to an output shaft of a motor;
a follower gear meshed with the drive gear, which is connected to a steering unit;
a bearing for supporting one end of the drive gear;
a support portion in which the bearing is disposed; and
a curved leaf spring comprising a length larger than a peripheral length of the bearing and fitted between the bearing and the support portion in a resiliently deformed state, said curved leaf spring being fitted along an outer peripheral surface of the bearing and an inner surface of the support portion,
wherein the curved leaf spring urges the bearing such that a distance between an axis of the follower gear and an axis of the drive gear decreases,
wherein said curved leaf spring comprises:
a first end having a notch formed thereon; and
a second end having a pair of notches formed thereon, and
wherein the notch on said first end is fitted between the pair of notches on said second end such that said first end and said second end intersect without increasing a width of said curved leaf spring.

14. A motor-driven power steering apparatus comprising:
a drive gear connected to an output shaft of a motor;
a follower gear meshed with the drive gear, which is connected to a steering unit;
a bearing for supporting one end of the drive gear;
a support portion in which the bearing is disposed; and
a curved leaf spring comprising a length larger than a peripheral length of the bearing and fitted between the bearing and the support portion in a resiliently deformed state, said curved leaf spring being fitted along an outer peripheral surface of the bearing and an inner surface of the support portion,
wherein the curved leaf spring urges the bearing such that a distance between an axis of the follower gear and an axis of the drive gear decreases, and
wherein said curved leaf spring comprises at least one spring protrusion formed on a side edge of a curved portion of the curved leaf spring, said at least one spring protrusion urges said bearing toward said motor.

15. The apparatus according to claim 14, wherein said at least one spring protrusion project from the curved portion and are inclined inwardly relative to the peripheral surface of the curved portion.

16. A motor-driven power steering apparatus comprising:
a drive gear connected to an output shaft of a motor;
a follower gear meshed with the drive gear, which is connected to a steering unit;
a bearing for supporting one end of the drive gear;
a support portion in which the bearing is disposed;
a curved leaf spring comprising a length larger than a peripheral length of the bearing and fitted between the bearing and the support portion in a resiliently deformed state, said curved leaf spring being fitted along an outer peripheral surface of the bearing and an inner surface of the support portion; and
a cushioning material coated on at least one surface of said curved leaf spring,
wherein the curved leaf spring urges the bearing such that a distance between an axis of the follower gear and an axis of the drive gear decreases.

17. A motor-driven power steering apparatus comprising:
a drive gear connected to an output shaft of a motor;
a follower gear meshed with the drive gear, which is connected to a steering unit;
a bearing for supporting one end of the drive gear;
a support portion in which the bearing is disposed; and
a curved leaf spring comprising a length larger than a peripheral length of the bearing and fitted between the bearing and the support portion in a resiliently deformed state, said curved leaf spring being fitted along an outer peripheral surface of the bearing and an inner surface of the support portion; and
a cushioning material coated on an inner surface of said curved leaf spring and an outer surface of said curved leaf spring,
wherein the curved leaf spring urges the bearing such that a distance between an axis of the follower gear and an axis of the drive gear decreases.

* * * * *